Nov. 3, 1931.   W. M. H. SANFORD   1,830,246
SANITARY FOOD PACKAGE
Filed Aug. 5, 1930
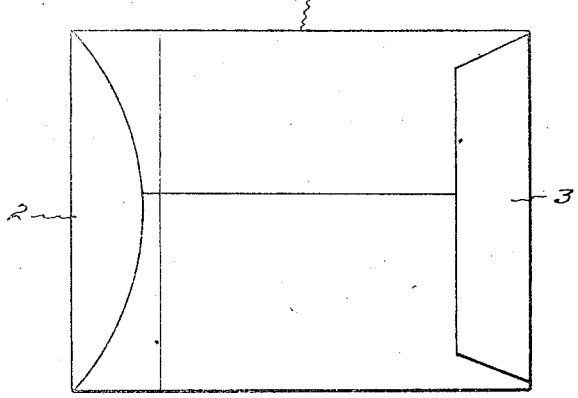
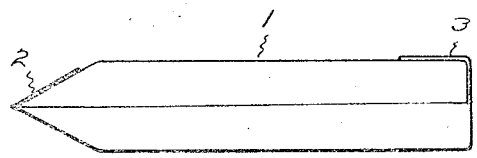
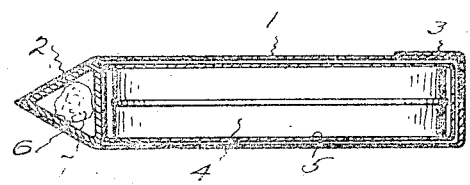
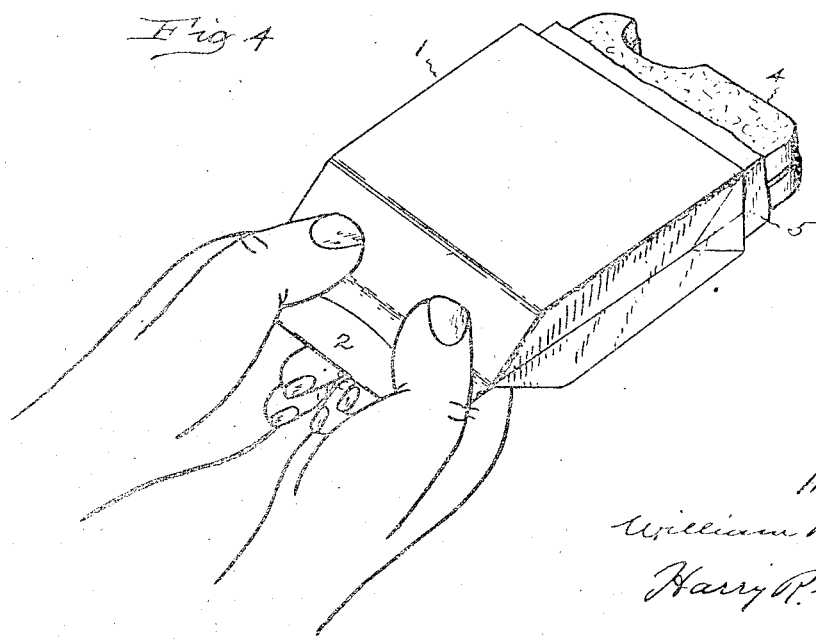
INVENTOR
William M. H. Sanford
Harry P. Williams
atty.

Patented Nov. 3, 1931

1,830,246

UNITED STATES PATENT OFFICE

WILLIAM M. H. SANFORD, OF HARTFORD, CONNECTICUT

SANITARY FOOD PACKAGE

Application filed August 5, 1930. Serial No. 473,253.

This invention relates more particularly to a package containing a sandwich although the filling may be other formed edible substance such as a piece of cake.

The object of the invention is to provide a sanitary package containing formed edible material which is so constructed that the edible filler will be thoroughly protected from the atmosphere, but may be easily and quickly extruded from the enclosing envelope and eaten without being touched by the hands of the consumer of the food.

The invention is embodied in a package which comprises a bag or envelope that is designed to be opened at one end only and that encloses a wrapper containing the edible substance. In the bag or envelope at the closed end below the edible substance is a follower or extruder, which when the closed end of the bag or envelope is pressed by the thumb and fingers, slides up and pushes the edible piece out from the open end of the bag or envelope without disintegrating it, and so that the edible piece may be eaten without being tainted by the hands or without soiling the hands.

In the accompanying drawings Fig. 1 shows a side view of a package which embodies the invention in closed condition. Fig. 2 shows an edge view of the same. Fig. 3 shows a longitudinal section. Fig. 4 is a view illustrating the use of the package.

The outside member of the package that is desirably made of thin waterproofed paper, is illustrated in the form of an envelope 1 which has a flap 2 at the end that is designed to remain permanently closed, and a flap 3 at the end from which it is desired to extrude the sandwich 4 that is encased in a wrapper 5 desirably of waxed paper. In the exterior enveloping member at the closed end and below the sandwich is a follower or extruder 6 that is triangular in cross section and is preferably made of a folded piece of cardboard covered with wax paper. With the follower in the bottom of the envelope, the edible contents of the package, which may be a sandwich, piece of cake or any similar article of food, is wrapped in the thin wrapper, preferably wax paper which will keep it fresh and protect it from the atmosphere, is inserted in the envelope on top of the follower and the open end of the envelope closed. When it is desired to eat the contained edible substance the upper end of the envelope is opened and the lower closed end is taken in the hands and upon squeezing the closed end the triangular follower slides up and forces the sandwich up so that it is extruded from the envelope without being broken. The inner end of the wrapper is torn off and the sandwich eaten, and as fast as it is consumed, by pressure on the follower more may be extruded and the wrapper further torn off.

If desired a condiment, relish, piece of gum, or stick of candy 7 may be placed in the triangular follower to be eaten after the sandwich has been consumed.

This package is simple and cheap. It protects the edible matter from the atmosphere and from becoming disintegrated, and the edible matter may be ejected and eaten without being touched by the hands of the consumer so that the hands do not become soiled nor does the edible matter become dirty or tainted by contact with the fingers.

The invention claimed is:

1. A food package comprising an exterior envelope having one end permanently closed and the other end adapted to be opened, formed edible substance encased in a wrapper enclosed in the envelope, and a follower that is triangular in cross section movable in the envelope at the closed end for extruding the wrapped edible substance from the open end of the envelope.

2. A package comprising a sandwich, an envelope enclosing the sandwich, and a triangular piece movable in the envelope below the sandwich and which when the envelope is squeezed adjacent to said piece will force the sandwich from the envelope.

WILLIAM M. H. SANFORD.